Sept. 27, 1932.   D. H. DAVIS   1,880,075
TUBULAR DRAWBAR FOR TRAILERS
Filed March 17, 1930   2 Sheets-Sheet 1

Inventor.
Durrel H. Davis.
by his Attorneys.

Witness
H. F. McKnight.

Sept. 27, 1932.　　　　D. H. DAVIS　　　　1,880,075
TUBULAR DRAWBAR FOR TRAILERS
Filed March 17, 1930　　2 Sheets-Sheet 2
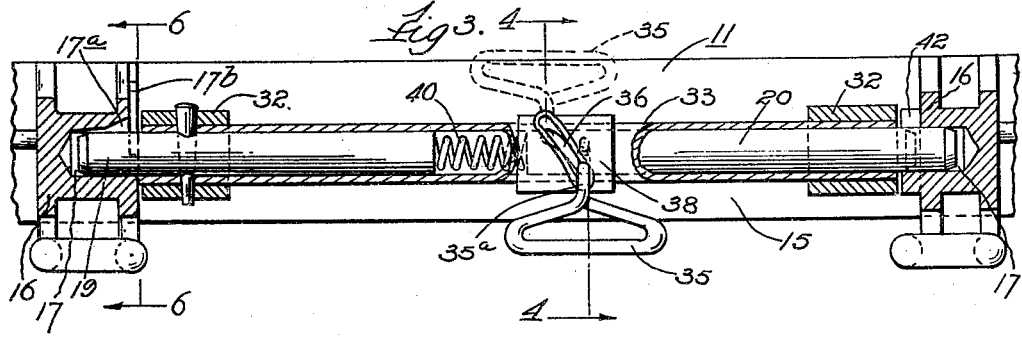
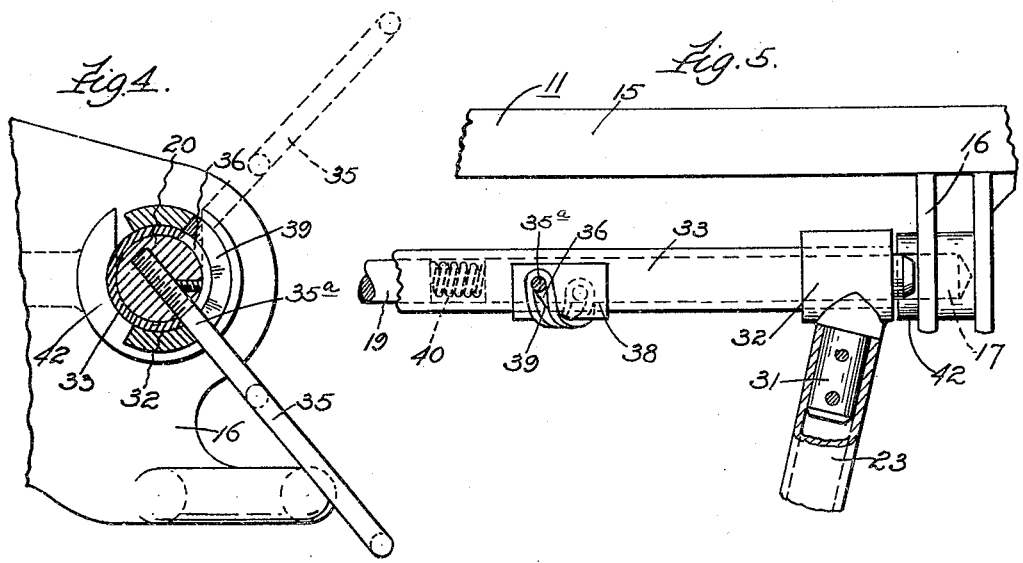
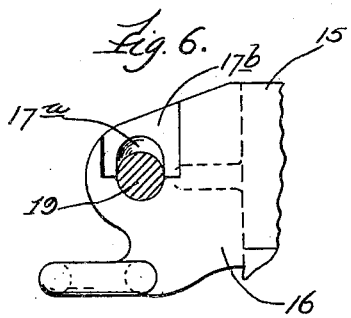
Inventor
Durrel H Davis
by his Attorneys Patented Sept. 27, 1932

1,880,075

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

TUBULAR DRAWBAR FOR TRAILERS

Application filed March 17, 1930. Serial No. 436,355.

This invention relates to vehicles and more particularly to an improved draw bar construction specially adapted for vehicles of the trailer type. One of the objects of the present invention is to provide an improved draw bar construction which is relatively light in weight, rigid and durable, capable of withstanding severe use and which may be economically manufactured. Another object is to provide improved means for locking the draw bar to the trailer; and a still further object is to provide means for locking the draw bar to the swivel truck of the trailer, which means includes an operating handle constructed and arranged to normally afford a convenient hand grip by virtue of which the draw bar may be bodily lifted for connection or disconnection with the swivel truck of the trailer, and adapted when grasped in such manner to cause retraction of its locking member to facilitate engagement with or removal from the bearing sockets of the swivel truck. It consists in certain features and elements of construction in combination, as herein shown and described, and as indicated by the claims.

In the drawings:

Figure 3 is an enlarged transverse vertical sectional view through the rear end of the draw bar taken substantially as indicated at line, 3—3, on Figure 1.

Figure 4 is a vertical section through the rear end of the draw bar taken at line, 4—4, on Figure 3.

Figure 5 is a fragmentary enlarged plan view of the rear end of the draw bar in position ready to be locked in the bearing sockets of the swivel truck.

Figure 6 is a sectional view taken at line 6—6 on Figure 3, showing one of the cheeks in side elevation.

For the purpose of illustration the present invention is shown in connection with a trailer vehicle having a main frame, 10, the forward end of which is mounted on a swivel truck, 11, which in turn is supported by the usual wheels, 12, and axle, 13. The forward end of the truck is formed as a unitary cast member, 15, and its outer face is provided with a pair of transversely spaced integral cheeks, 16, which are formed with bearing sockets, 17, for supporting the laterally extending trunnions, 19 and 20, respectively, of the draw bar indicated generally at 21.

It is frequently necessary to be able to readily disconnect the draw bar from the swivel truck, such as in instances where the trailer vehicle is of the double steer type in which either end of the vehicle may be made the leading and steering end. Accordingly, it is desirable that the draw bar be made relatively light to facilitate handling, but with sufficient durability and ruggedness of construction to withstand the severe use to which a vehicle of this character is ordinarily subjected. For this purpose my improved draw bar construction includes a pair of tubular side members, 23, spaced apart at their rear ends while their forward ends converge toward each other and are rigidly connected to a coupling fitting, 24, which includes the usual eye, 25, adapted for connection to a suitable hook or similar member of a draft vehicle. The fitting also includes a pair of integral diverging legs, 26, which are telescoped in and rigidly connected to the ends of the respective tubular members.

Figure 1:
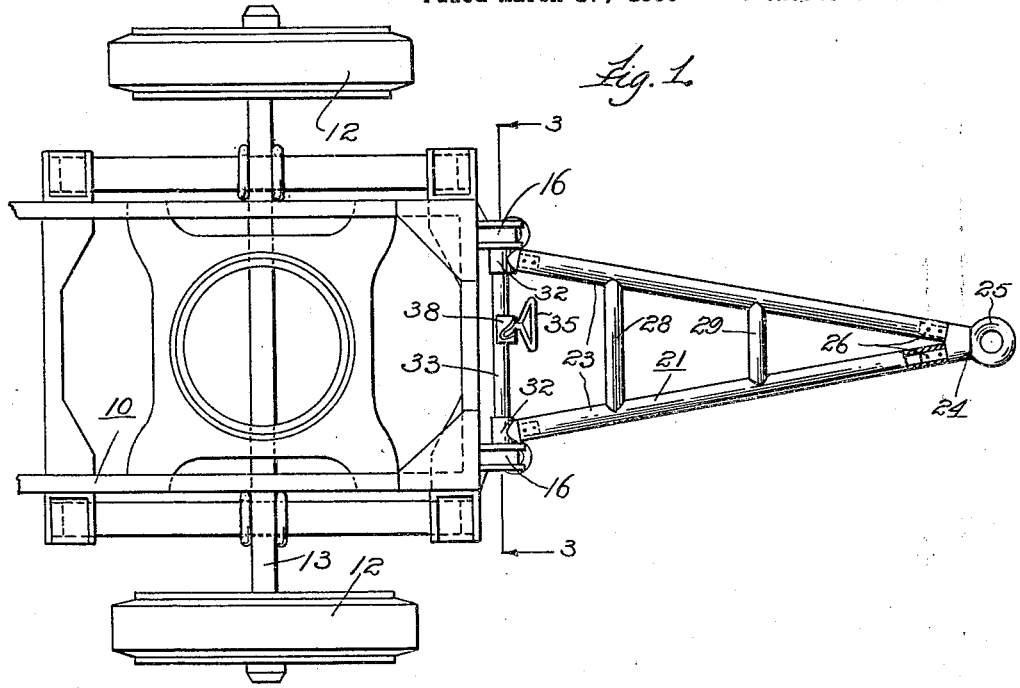
Figure 1 is a fragmentary plan view of a vehicle equipped with a draw bar embodying the present invention.
Figure 2:
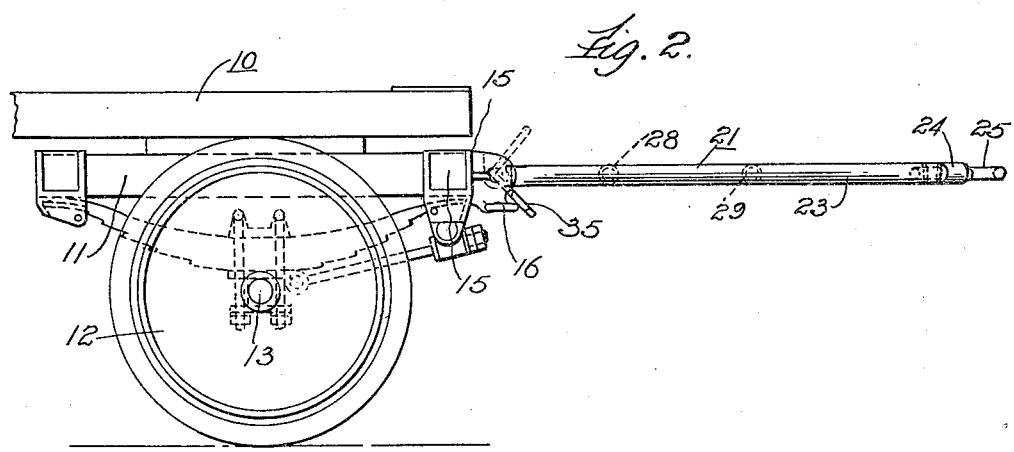
Figure 2 is a side elevation of the same.

The spacing apart of the side members produces a triangular construction and to insure proper rigidity these side members are connected together by a pair of longitudinally spaced tubular bracing members, 28 and 29, which are disposed in the same plane as said side members, as may be seen in Figure 2 of the drawings. The connection of the ends of these braces to the side members may be made in any suitable manner such as by welding, brazing, etc.

Telescoped in and rigidly secured to the rear ends of the tubular side members are the stud portions, 31, of the fittings, 32, which are rigidly secured on the respective ends of a transversely extending tubular member, 33, which forms the third side of and completes the triangular draw bar structure. The tubular side members and their connecting rear end member, 33, are preferably dimensioned so as to fit nicely between the cheeks, 16. This tubular member, 33, also serves to support the laterally extending trunnions, 19 and 20, respectively, which are engageable in the bearing sockets, 17, of the cheeks, 16. As may be seen in Figure 3 of the drawings, the left hand cheek, 16, is shown with its bearing socket slightly enlarged at the upper portions as indicated at 17ª, so as to facilitate the entry of the trunnion, 19, which is rigidly secured in the tubular member, 33. To insure guidance of the rigid trunnion, 19, into its socket, I also provide an upwardly open slot, 17ᵇ, on the inner face of its cooperating cheek by means of which the end of the fixed trunnion may be properly directed into the socket. The trunnion, 20, is axially movable in telescopic relation in the tubular member, 33, and this axial movement of said trunnion, 20, is controlled by an operating handle, 35, which extends through an obliquely disposed slot, 36, which is formed in and adjacent the longitudinal center of the tubular member, 33, said handle being rigidly connected to said trunnion, 20.

It will be apparent that by reason of the slot being formed obliquely the shank, 35ª, of the handle acts "cam-wise" against the edges of the slot which afford a limited range of vertical movement of said handle while simultaneously effecting lateral movement of the handle, thus causing the trunnion to be projected or retracted with respect to its tubular member, 33.

To insure reinforcement for the portion of this tubular member surrounding the slot, and for effectively producing the camming action, I provide a fitting, 38, which is rigidly secured to the exterior of the tubular member, and which is also provided with a slot, 39, (reinforced by a boss or bead around its edges), which slot substantially registers with the slot, 36, in the tubular member, 33. The trunnions are of substantial length, and interposed between the ends of the trunnions, 19 and 20, is a coiled spring, 40, which yieldingly urges the trunnion, 20, into extended position, and thereby tends to swing the handle member, 35, to its lowermost downwardly oblique position as seen in full lines in Figure 4.

As may be seen in the drawings, the handle member, 35, is formed in convenient shape to afford a suitable hand grip so that for lifting the draw bar for engagement or disengagement with the bearing sockets on the trailer it may be conveniently grasped by this handle with one hand and either of the braces, 28, or 29, with the other hand, so as to suitably balance the draw bar, and when it is thus lifted, the handle (due to the weight of the draw bar), acts cam-wise in the slots, 36 and 39, and retracts the trunnion, 20, as may be seen in Figure 5 of the drawings, in which position it may be readily removed from or inserted in the bearing sockets of the cheeks, 16.

The construction of the draw bar from tubular stock affords ample rigidity, rendering it relatively light in weight, and capable of being conveniently handled by a single individual; and to facilitate the engagement or disengagement of the trunnions in the bearing sockets of the cheeks I preferably form the cheek (herein shown at the right hand side) which is to receive the retractable trunnion, with an inwardly projecting upwardly open U-shaped socket extension, 42, which is adapted to receive that portion of the trunnion, 20, which normally projects beyond the member, 33, when it is at its limit of telescopic movement. This extension, 42, thus serves to definitely position the trunnion, 20, so as to align it with and insure engagement in its bearing socket, or to support the draw bar after the trunnion, 20, has been retracted, preparatory to the disengagement of the draw bar from the trailer.

This construction greatly facilitates either operation; the trunnion, 20, is almost automatically aligned with its socket by the mere lowering of the draw bar between the cheeks,—and this trunnion, 20, is automatically withdrawn by the mere lifting of the draw bar for removal.

I claim:—

1. In combination with a vehicle having a swivel truck and supporting wheels therefor, a draw bar provided at its rear end with laterally extending trunnions, the truck being provided with a pair of transversely spaced cheeks having bearing sockets for said trunnions, said draw bar having a hollow transverse member at its rear end dimensioned to fit between said cheeks, one of said trunnions being fixed, and the other of said trunnions being axially movable into and out of engagement with its socket, and means connected to said last mentioned trunnion for controlling its movement.

2. In combination with a vehicle having a swivel truck and supporting wheels therefor, a draw bar provided at its rear end with a transverse tubular member, laterally extending trunnions carried at the ends of said member, a pair of cheeks on the front of the truck spaced transversely apart for accommodating the transverse member, and having bearing sockets for the trunnions, one of said trunnions being axially movable in the transverse member for withdrawal from its socket to permit removal of the draw bar, and an operating handle extending through a slot in the tubular member and positively connected to the movable trunnion, said slot being obliquely disposed for permitting a limited range of vertical movement of the handle, and providing camwise movement of the handle in a manner to cause axial travel of said movable trunnion in response to vertical movement of said handle; said handle serving as a convenient grip for lifting the draw bar into or out of operative engagement with the sockets, whereby the grasping of said handle in lifting the draw bar automatically retracts said movable trunnion.

3. In combination with a vehicle having a swivel truck and supporting wheels therefor, a draw bar provided at its rear end with a transverse tubular member, laterally extending trunnions carried at the ends of said member, a pair of cheeks on the front of the truck spaced transversely apart for accommodating the transverse member, and having bearing sockets for the trunnions, one of said trunnions being axially movable in the transverse member for withdrawal from its socket to permit removal of the draw bar, an operating handle extending through a slot in the tubular member and positively connected to the movable trunnion, said slot being obliquely disposed for permitting a limited range of vertical movement of the handle, and providing camwise movement of the handle, in a manner to cause axial travel of said movable trunnion in response to vertical movement of said handle; and a spring disposed in the tubular member, reacting between a fixed stop and end of the movable trunnion, for normally maintaining said trunnion extended and said handle at its lowermost position of adjustment.

4. In combination with a vehicle having a swivel truck and supporting wheels therefor, a draw bar provided at its rear end with a transverse tubular member, laterally extending trunnions carried at the ends of said member, a pair of cheeks on the front of the truck spaced transversely apart for accommodating the transverse member, and having bearing sockets for the trunnions, one of said trunnions being axially movable in the transverse member for withdrawal from its socket to permit removal of the draw bar, and an operating handle extending through a slot in the tubular member and positively connected to the movable trunnion, said slot being obliquely disposed for permitting a limited range of vertical movement of the handle, and providing camwise movement of the handle in a manner to cause axial travel of said movable trunnion in response to vertical movement of said handle; said movable trunnion in telescoped position normally projecting slightly beyond the end of said transverse members, and the co-operating cheek having a lateral extension adapted to provide a stop rest for said slight projection of the trunnion for insuring guidance thereof into its bearing socket.

5. In combination with a vehicle having a swivel truck, a draw bar provided with laterally projecting trunnions, the truck having cheeks spaced apart to accommodate said drawbar with its trunnions engaged in sockets in said cheeks, one of the trunnions being axially movable for withdrawal from its socket to permit detachment of the drawbar from the truck, and an operating handle associated with the drawbar adapted to serve for lifting and carrying it and connected to said movable trunnion in a manner to cause its said withdrawal when the weight of the drawbar is supported by said handle.

DURREL H. DAVIS.